Nov. 2, 1965 T. WYATT ETAL 3,215,365
SPACECRAFT PROPULSION CONCEPT
Filed April 30, 1963 3 Sheets-Sheet 1
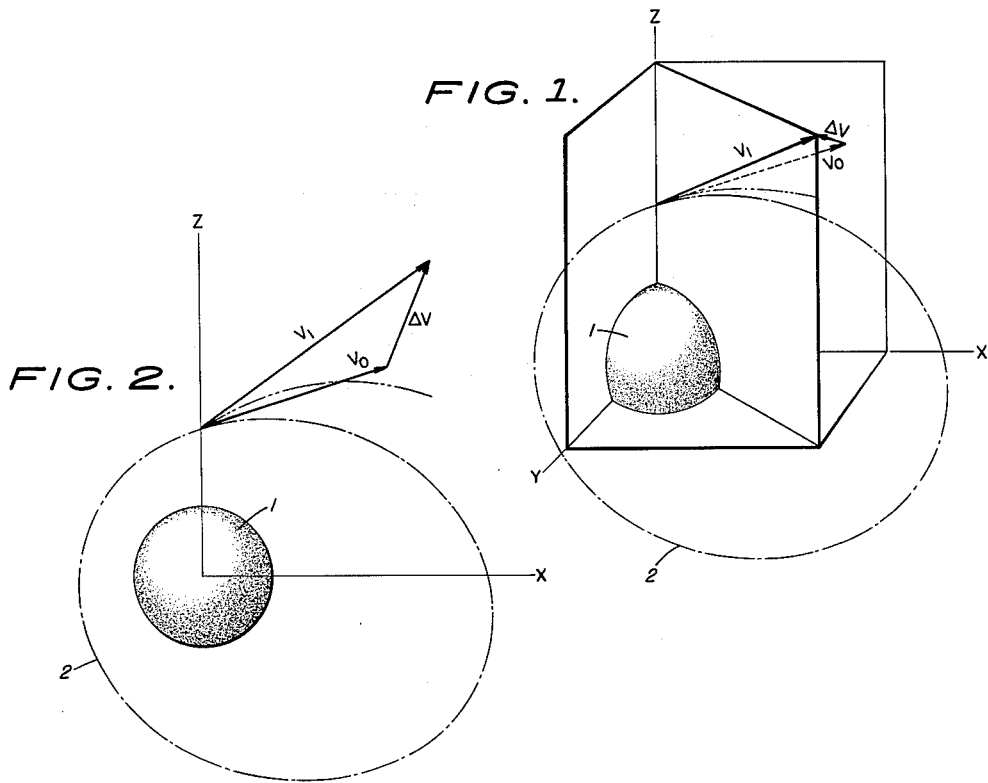
FIG. 1.
FIG. 2.
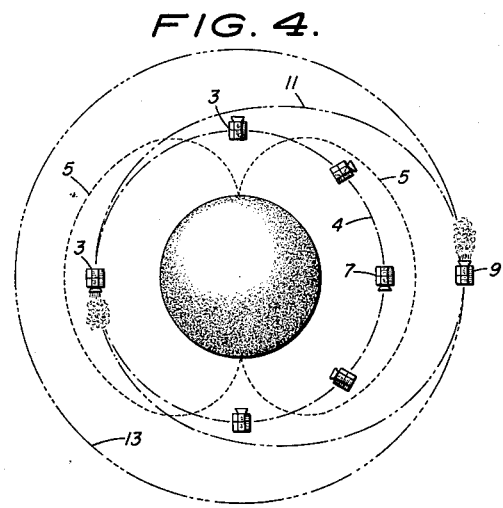
FIG. 4.
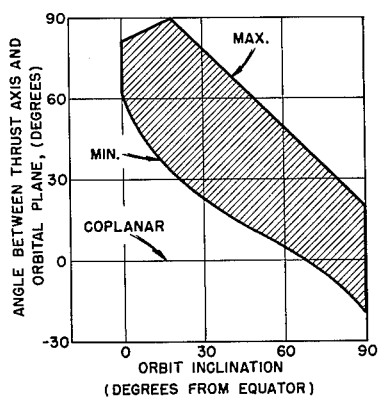
FIG. 3. ORIENTATION OF MAGNETIC AXIS WITH ORBITAL PLANE
INVENTORS
Theodore Wyatt
Charles J. Swet
John Dassoulas
BY Claude Funkhouser
ATTORNEY Nov. 2, 1965 T. WYATT ETAL 3,215,365
SPACECRAFT PROPULSION CONCEPT
Filed April 30, 1963 3 Sheets-Sheet 2
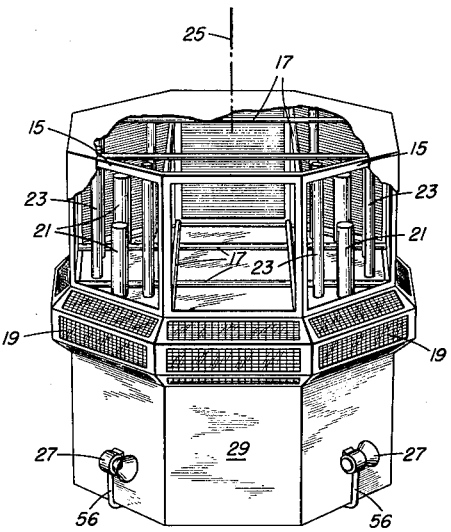
FIG. 5.
FIG. 6.
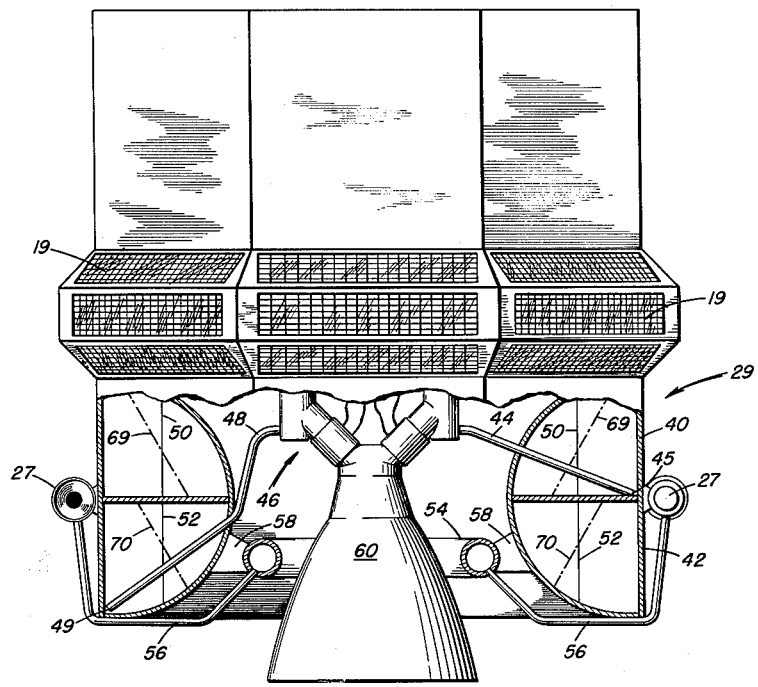
Theodore Wyatt
Charles J. Swet
John Dassoulas
INVENTORS
BY Claude Funkhouser
ATTORNEY Nov. 2, 1965     T. WYATT ETAL     3,215,365
SPACECRAFT PROPULSION CONCEPT
Filed April 30, 1963     3 Sheets-Sheet 3
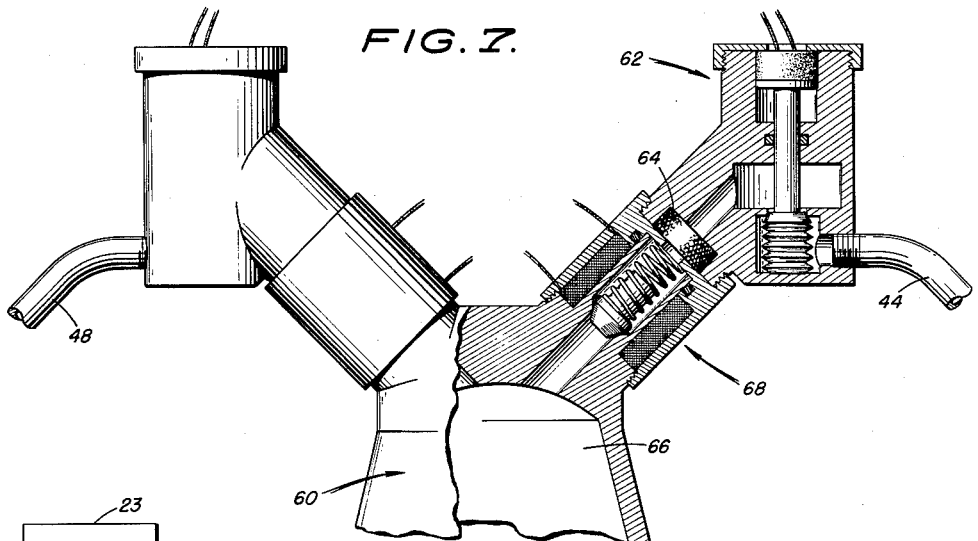
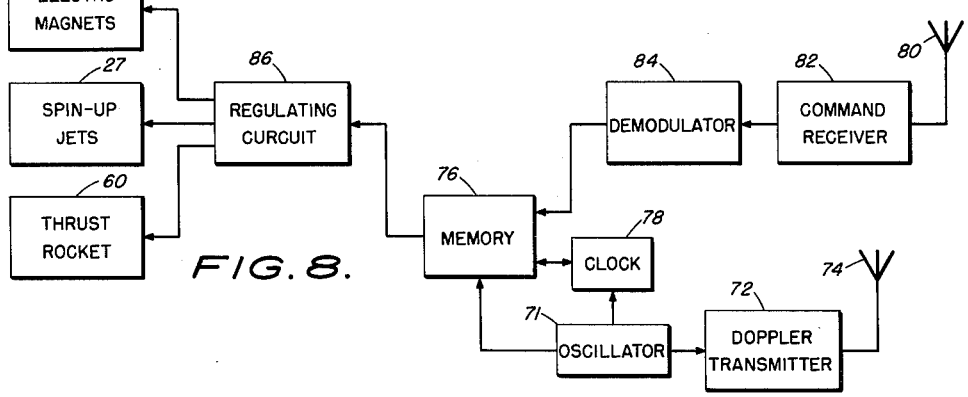
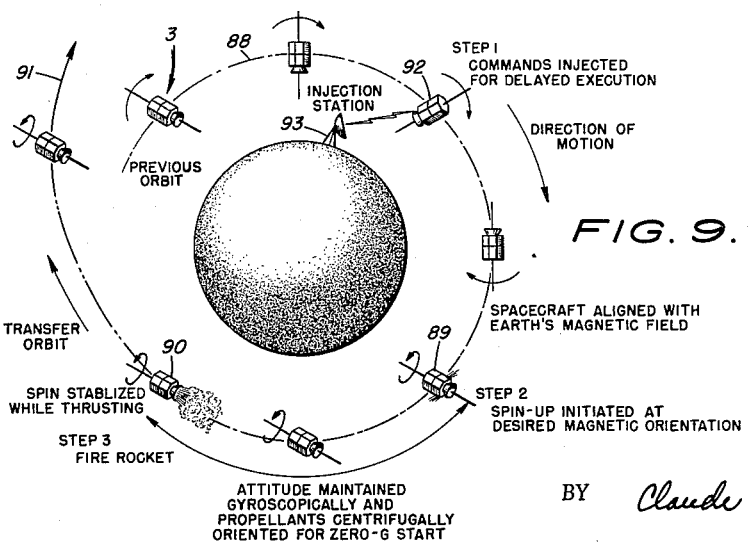
Theodore Wyatt
Charles J. Swet
John Dassoulas.
INVENTORS
BY Claude Funkhouser
ATTORNEY United States Patent Office 3,215,365
Patented Nov. 2, 1965

3,215,365
SPACECRAFT PROPULSION CONCEPT
Theodore Wyatt, Charles J. Swet, and John Dassoulas, Silver Spring, Md., assignors to the United States of America as represented by the Secretary of the Navy
Filed Apr. 30, 1963, Ser. No. 277,671
9 Claims. (Cl. 244—1)

This invention relates to satellite orbit alteration techniques and, more particularly, to an adjustment technique which makes a plurality of successively more refined changes in a satellite's orbit until the exact orbit required is attained.

Attaining an intended orbit about the earth for a satellite is a complex problem. The problem is further complicated by the use of a launch vehicle at its maximum weight lifting capacity. Occasionally, a rocket develops less total impulse than expected and/or exhibits guidance deficiencies, threatening the attainment of the satellite's intended orbit, and the entire usefulness of the satellite's mission.

The orbit deficiencies may appear as a difference in the orbital period, eccentricity, inclination, nodal longitude, or argument of perigee, or as any combination of such differences. They may be fairly small, reflecting only the dispersion about nominal booster performance, or they may be substantial, caused by some unexpected aberrance. The orbit deficiencies may appear as a recognized altitude penalty imposed by inadequate booster impulse, or they may be deliberate where the mission calls for a succession of different orbits or a final de-orbiting maneuver. Clearly, many planned and unplanned situations can arise which call for orbit alteration, the precise nature and extent of which cannot always be determined by prelaunch analysis.

The instant invention has been designed to operate in combination with a satellite magnetically oriented within the earth's magnetic field. The predictability of the earth's magnetic field is used as a means to determine the attitude of the satellite with respect to its orbital plane and to provide the correct combination of attitude and position for adding an additional impulse to shift the satellite to a new orbit.

A considerable amount of original research effort has been expended in developing a model of the earth's magnetic field. This work has successfully reached a point where it is possible to predict the pitch attitude of a magnetically oriented satellite in a given earth orbit. The pitch attitude is the angle in the orbital plane between the stabilized axis and a tangent to the instantaneous flight path. The Vestine model of the earth's magnetic field has been accepted by knowledgeable scientists as an accurate model. Therefore, it is felt that it isn't necessary to completely describe how the satellite's attitude changes as it orbits the earth. However, a basic explanation is given hereinafter.

Since the invention is designed to operate within a predictable magnetic field it is not limited to the earth's magnetic field, but will function with any celestial body having a determinable magnetic field.

One object of this invention, therefore, resides in the provision of a method for satellite orbit alteration which will operate within a known or determinable magnetic field.

A further object of this invention is to provide a method of satellite orbit alteration for maneuvering a satellite in space within a given orbit or into new orbits.

A still further object of this invention is to provide a method of satellite orbit alteration that does not destroy the compatibility of the satellite with its launching vehicle, and which will increase the efficiency of the entire launching system.

Other objects and many of the attendant advantages of this invention will be readily appreciated as the same becomes better understood by reference to the following detailed description when considered in connection with the accompanying drawings, wherein:

FIG. 1 is a schematic view showing a typical orbit alteration according to the instant invention, with an accompanying change in orbital plane;

FIG. 2 is a schematic view showing a typical orbit alteration according to the instant invention, without an accompanying change in orbital plane;

FIG. 3 is a graph showing the angle between the thrust axis and the orbital plane for various orbit inclinations of a magnetically stabilized satellite;

FIG. 4 is a schematic view showing a representative maneuver in changing a satellite's orbit;

FIG. 5 is a perspective view of the satellite used to practice the instant invention, showing particularly the apparatus used to despin and magnetically orient the satellite;

FIG. 6 is a side elevation of the satellite used to practice the instant invention, showing particularly the apparatus used to alter the orbit of the satellite;

FIG. 7 is a schematic diagram of the propellent feed system used in the instant invention;

FIG. 8 is a block diagram of the electronics in a satellite used to practice the instant invention; and FIG. 9 is a schematic view showing the use of spin-up techniques possible with the instant invention.

Briefly, the invention contemplates the launching of a satellite carrying an orbit improvement system into the maximum orbit possible, according to the capabilities of its launching vehicle. Then, alignment of the satellite with the earth's magnetic field is accomplished by an electromagnet positioned aboard the satellite. The magnet has its dipole axis parallel with the satellite axis of symmetry, which is also the thrust axis and the spin axis. To assure close alignment with the earth's magnetic field, the satellite is also despun prior to activation of the electromagnet by means of the despin rods described by R. Fischell in his U.S. patent application entitled "Magnetic Despin Mechanism," Serial No. 83,603, filed January 18, 1961, and now U.S. Patent No. 3,114,518. These despin rods are additionally used to damp out oscillations about the local magnetic field once magnetic capture has occurred.

The satellite is tracked by any tracking method to determine its orbital parameters. From these parameters and the Vestine model of the earth's magnetic field, it is possible to determine the time at which the stabilized axis will have a particular attitude with respect to the earth. The importance of this predictability is that the accuracy of the system depends on the measurement of time which can be very accurately measured.

Once the actual orbital parameters of the satellite are determined, the nature and extent of the first velocity change is selected in order to alter either the satellite's period, eccentricity, inclination, nodal longitude, or argument of perigee or any combination of these parameters. However, it is to be understood that the change need not be made in one step. On the contrary, the orbit alterations may be performed in one or more stages, depending on its magnitude, complexity, precision, and allowable time for accomplishment. Additionally, the change may result in a braking effect upon the satellite and cause the re-entry and recovery of the satellite on the earth or a removal to an intermediate orbit from its previous orbit.

The selected velocity change is instigated at a certain geographical and orbital location of the satellite when the stabilized axis of the satellite, on which a rocket motor is mounted, is in the right position to give the required added directional impulse upon firing of the rocket. For example, the application of an added impulse at an oblique angle to the plane of the orbit results in a change in altitude, period, eccentricity, inclination and nodal longitude, or a combination of less than all, depending upon the angle between the path of flight and the impulse axis as seen in FIG. 1, while an application of impulse within the plane of the orbit results in a change in altitude, period or eccentricity, as can be seen in FIG. 2.

FIGS. 1 and 2 are schematic representations of an orbital path of a satellite circling the earth 1 in an orbit 2 and the velocities associated with the moving satellite. $V_0$ represents the steady state velocity of the satellite, $\Delta V$ represents the velocity increment added by use of the instant invention, resulting in a new satellite and velocity $V_1$.

However, when selecting the point at which an impulse will be added, it is important not only to determine the pitch angle as hereinbefore mentioned, but also to determine the out-of-plane relationship of the magnetically oriented satellite in respect to its orbit. FIG. 3 shows the various out-of-plane angles between the thrust axis of a satellite and the orbital plane, for diverse angles of inclination. For example, a satellite in a polar orbit, having an inclination of 90 degrees, has its thrust axis vary approximately 25± degrees from coplanar. That is, as the satellite passes in a complete orbit, it appears to wobble about its magnetically stabilized axis. However, a satellite launched into an orbit with 60 degrees inclination will wobble only on one side between approximately 5 and 55 degrees. Since the thrust which alters the inclination and nodal longitude varies with the cosine of the out-of-plane angle, while the thrust which alters the period, altitude and eccentricity varies as the sine of the out-of-plane angle, the correct out-of-plane angle must be selected during the orbit which has a sufficient in-plane component to attain the new desired orbit.

From FIG. 3, it can be seen that highly inclined orbits above approximately 67 degrees provide a coplanar thrust angle corresponding to the desired direction of the velocity increment to change the attitude or period of the orbit alone. For satellites having lesser angles of inclination, the in-plane component will alter the altitude period and eccentricity, while the out-of-plane component will alter the inclination or nodal longitude. However, since these orbits never have a coplanar component, it is not possible to change only the period, altitude or eccentricity alone, but only with an associated change of nodal longitude and inclination.

Highly inclined orbits of greater than approximately 67 degrees are most likely to provide pitch angles corresponding to the desired direction of the velocity increment, to change the altitude or period of the orbit only.

The position of a specified point in the orbit with respect to the earth, such as perigee or apogee, changes continually due to the precession of perigee. Thus, the simultaneous satisfaction of the above-mentioned three conditions of out-of-plane angle, pitch angle and point within the orbit can be obtained over a finite range of values for a given orbital inclination by selection of a calendar date and a time on the date. Since perigee precession is fairly slow, the right conditions will recur for several times during consecutive orbital revolutions. Conversely, it may be necessary to wait for a considerable period for the desired amount of perigee precession to occur. This disadvantage is removed by spinning up the satellite having the proper out-of-plane angle and pitch angle under magnetic control, thereby preserving these angles by a gyroscopic stabilization until the perigee position or other proper point in the orbit is obtained. After a time, the spin would be damped out by the electromagnetic despin technique and magnetic attitude control would be restored, and, if desired, the process could be repeated as often as required to attain the proper combination of position and attitude.

The major advantage of this temporary "freezing" of a magnetic attitude and of the subsequent transferring of the attitude to another point in the orbit for application of a velocity increment is that time need not be wasted in waiting for the proper point in the orbit to precess around to the proper attitude for rocket firing, but, rather the attitude can be carried around to the firing point.

Referring to FIG. 4, there can be seen a schematic representation of a magnetically oriented satellite 3 orbiting the earth. A method for magnetically orienting a satellite is completely described by Fischell et al. in their U.S. patent application entitled "Magnetic Attitude Control," Serial No. 99,644 filed March 30, 1961, and now U.S. Patent No. 3,118,637. It is sufficient for the understanding of this invention to briefly describe magnetic orientation by stating that the satellite carries magnets which align themselves, and thereby the satellite, with the earth's magnetic field, and therefore cause the satellite to tumble in the plane of the magnetic field. The angle between a tangent to the orbit and a line through the thrust axis is called the pitch angle.

The satellite 3 has been launched into a low orbit designated by a line 4. This orbit is shown as a circular orbit, but any orbit configuration would work equally as well. Additionally, the satellite 3 is shown in several different positions demonstrating the above-mentioned tumbling effect of the magnetically stabilized satellite as it aligns itself with the earth's magnetic field represented by a dashed line 5.

Prior to attaining a magnetically oriented satellite, the satellite must be despun. A suitable method for despinning such a satellite is described by R. Fischell in his above-mentioned U.S. Patent No. 3,114,518. It is sufficient for the understanding of the instant invention to indicate that a plurality of permeable rods are mounted on or within the satellite so that they lie in a plane or planes that are perpendicular to the magnetic axis of stabilization. These rods may be grouped, with various groups laying at right angles to each other. The permeable rods will dissipate the rotational energy by providing a type of magnetic braking effect.

A satellite located in the orbit 4 may have been intended to orbit at a higher altitude which it failed to attain. As previously described, when the correct pitch angle and in-plane component of the thrust vector are present and the satellite is at the perigee of its orbit, it is possible to add thrust which will increase the apogee from its present position 7 in orbit 4 to a new location 9 in an orbit 11. However, by increasing the apogee of the satellite's orbit, the circular orbit has been changed to the elliptical orbit 11, although the new apogee is now at the desired altitude.

It is now possible to change the new elliptical orbit into a circular obit, keeping the altitude of the apogee 9 by thrusting again when the satellite has a zero pitch angle, but this time when the satellite is at the apogee. This additional thrust will raise the perigee until the orbit is essentially a circular one 13.

The amount of thrust to be added first at the perigee and later at the apogee can be determined by using mathematical solutions well-known in the art of astrophysics.

Referring to FIG. 5, there can be seen a perspective view of a satellite which is used to practice the instant invention. Disposed within the satellite frame 15, a plurality of despin rods 17 are grouped together and lie in a plane or planes. As shown, pairs of spaced rods lie at right angles to each other and in intersecting relationship. A plurality of solar cell panels 19 are symmetrically arranged about the satellite to supply electrical energy to a plurality of batteries 21, which among other things are used to activate a plurality of electromagnets 23. The magnetic dipole axes should be parallel with the satellite axis of symmetry, to align that axis with the earth's magnetic field. The disposition of the electromagnets shown in FIG. 5 causes the longitudinal axis 25 to align with the earth's magnetic field. A plurality of spinup nozzles 27, two of which are shown, are symmetrically located upon an adjustment module 29, and upon activation will impart rotation about the magnetically stabilized axis 25.

The spin imparted to the satellite is used to stabilize the satellite while thrusting; also for settling liquid propellants for zero-g starts, thereby eliminating the need for bladders, and for gyroscopically holding a magnetically acquired attitude for later use.

The adjustment module 29 shown in a cut-away view in FIG. 6 is symmetrically constructed, thereby preventing any unwanted change in the satellite attitude once the satellite has assumed the proper attitude, and the satellite is spun-up to preserve that attitude for a later position in its orbit. The system contains a pair of hemitoroidal tanks 40 and 42. A fuel such as hydrazine may be stored in the tank 40, and an oxidizer, such as nitrogen-tetroxide, may be placed in the tank 42. Each tank contains an integral charge of pressurizing gas such as nitrogen for propellant feed, introduced prior to launching through a pressurization connector which is not shown.

A fuel line 44 conducts the fuel from the tank 40 by an inlet 45 to an injection system 46, and an oxidizer line 48 conducts the oxidizer from the tank 42 by an inlet 49 to the injection system 46. The inlets 45 and 49 are positioned within the tanks so as to remain below the fuel and oxidizer levels represented by lines 50 and 52 respectively.

The fuel and oxidizer levels assume the configuration shown in the FIG. 6, under spin-up forces created by the venting of gases, which gases are stored in a toroidal pressure chamber 54, and released by means of a plurality of pressure lines 56 and nozzles 27. The chamber 54 is symmetrically disposed about the longitudinal axis 25 and is attached to the tank 42 by suitable means 58.

The fuel and oxidizer react in the combustion chamber 66 of the rocket motor 60 and provide thrust along the axis 25.

The metering system shown in FIG. 7 has the same arrangement for both the fuel and the oxidizer input portions, although only the fuel input portion is shown. The fuel enters a normally closed explosive valve 62 through the fuel line 44. The explosive valve prevents fuel from passing into the motor prior to the first commanded thrusting period. A suitable explosive valve is that identified as type I, Model Class A-4 manufactured by the Conax Corp. The fuel is filtered in a filter 64 and enters the combustion chamber 66 of the rocket 60 through a solenoid valve 68.

Referring again to FIGS. 6 and 7, each propellant tank 40 and 42 is initially filled half or two-thirds full, then the ullage space is charged with all of the pressurizing gas that will ever be used prior to launch. When thrust is first commanded, after spin has whirled the liquid levels out to form cylindrical surfaces 50 and 52 and immersed the propellant feed inlets 45 and 49, the squib-actuated valves 62 are fired and the solenoid valves 68 are opened. The pressurized propellants are then forced through the metering system 46 to the combustion chamber 66, where they ignite hypergolically. The axial thrust then produces an acceleration which re-orients the liquid level as indicated by the dotted lines 69 and 70, in FIG. 6, with the propellant feed inlets 45 and 49 still immersed. Thrust continues, at a gradually reducing level as the gas pressure drops with increasing ullage volume, until the solenoid valves are signalled to close. This thrusting period produces a certain total impulse which corresponds to the desired velocity change. Through knowledge of the system characteristics and a record of cumulative burn time, each velocity change can thusly be controlled by the preselected duration of valve opening, or burn time.

It is to be noted that this system is not limited to instances requiring substantial velocity changes requiring a large rocket. On the contrary, orbit alterations may be required which need only modest propulsion forces. The choice of the type of propulsion employed is heavily dependent upon the magnitude of the orbit alteration desired, the accuracy desired, the necessity for repetitive operation, either for vernier corrections in order to obtain high accuracy or to obtain more than one major alteration of the orbit, and the maintainability of the propulsion system in the space environment. Thus, applicable propulsion techniques may include bi-propellant liquid rockets, monopropellant liquid rockets, solid propellant rockets, cold gas jets, and small explosions or slug ejections.

The electronics required in the instant invention are shown in block diagram in FIG. 8, and include a very stable oscillator 71. A suitable oscillator for the purpose is that described by J. B. Oakes et al. in their article entitled "Design of an Ultrastable Oscillator for Satellites," in the September-October 1962 issue of the Technical Digest published by the Applied Physics Laboratory of The Johns Hopkins University. The oscillator 71 has three output signals; one is applied to a Doppler transmitter 72 which furnishes a signal to be transmitted by an antenna 74 to provide a means for Doppler tracking of the satellite. The second output of the oscillator 71 is applied to a suitable memory 76 and controls the filling of the memory and the reading out of stored information for the delayed execution of command signals. The third signal from the oscillator is applied to a clock 78 which is used in conjunction with the memory 76 and connected thereto, to determine when the stored command signals will be executed.

Command signals are received by an antenna 80 and separated from their carrier in a command receiver 82. The command receiver 82 applies its output to a demodulator 84 which recognizes the incoming information signals and changes their form for application to the memory 76. The memory 76 applies its output signals to a regulating circuit 86 which may activate the electromagnets 23 the spin-up jets 27, or the thrust rocket 60.

The magnetically oriented satellite 3 is shown tumbling in the earth's magnetic field in FIG. 9, having a polar orbit 88. By using the Vestine model of the magnetic field, it is determined that the satellite will have the proper pitch in position 89 which must be coupled with the perigee at position 90 in order to provide an in-plane component of thrust to change the present orbit to a new orbit 91.

As the satellite 3 reaches position 92, an earthbound injection station 93 fills its memory system 76, as seen in FIG. 8, with command signals for determining the sequence of the following events. The satellite continues to tumble in the earth's magnetic field thereby continuously changing its pitch angle. Computations involving the satellite's orbital parameters and the Vestine model of the earth's magnetic field show that the rocket should be spun-up when it reaches position 89 where it possesses the desired magnetic pitch orientation. The memory system signals the spin-up jets, deployed about the rocket, to ignite and to impart rotation about the satellite's thrust axis thereby gyroscopically maintaining the desired pitch attitude of the satellite. The attitude is frozen as the satellite continues in its orbit to position 90 at which time the memory signals the thrust rocket to operate and add the thrust required to alter its present orbit to a new orbit 91.

Obviously, many modifications and variations of the present invention are possible in the light of the above teachings. It is therefore to be understood that within the scope of the appended claims the invention may be practiced otherwise than as specifically described.

What is claimed is:

1. A method for altering the orbit of a space vehicle, comprising,
    launching a space vehicle into an orbit about a celestial body having a magnetic field,
    reducing the spin of said vehicle induced by the launching means,
    orienting said vehicle with the magnetic field through which it is moving, tracking said vehicle to find its orbital parameters, determining the angular relationship between said vehicle and its instantaneous flight path by using said orbital parameters, spinning up said vehicle to gyroscopically preserve a particular angular relationship from one position in its orbit to a later position, and changing the veolcity vector of said vehicle upon reaching said last mentioned position.

2. A method for altering the orbit of a space vehicle, comprising, launching a space vehicle into an orbit about a celestial body having a magnetic field, decreasing the rate of spin of said vehicle induced during the launching of said vehicle, orienting said vehicle with the magnetic field through which it is moving, tracking said vehicle to find its orbital parameters, determining the angular relationship between said vehicle and its instantaneous flight path for successive positions in its orbit, computing the position of said space vehicle by using said orbital parameters for attaining a correspondence of one particular angular relationship and a position within said vehicle's orbit to acquire a new orbit, spinning up said vehicle to gyroscopically preserve the particular angular relationship, monitoring said vehicle as it moves to the correct position in its orbit for maintaining said particular angular relationship, and changing said vehicle's velocity vector to alter its orbital parameters as desired.

3. In an orbiting space vehicle of symmetrical construction moving in a magnetic field of a celestial body, an orbit alteration system for adjusting the orbital parameters of said vehicle, comprising, despin rods contained within said vehicle for reducing the random spinning of said vehicle, magnetic means positioned within said vehicle and creating a vehicle dipole axis parallel with the vehicle's axis of symmetry for attaining predictable vehicle orientation in orbit, spin-up means attached to said vehicle for imparting rotation about the axis of symmetry of said vehicle, propulsion means mounted within said satellite and positioned to create a thrust axis along the symmetry axis of said vehicle, and control means for sequentially activating said magnetic means, said spin-up means, and said propulsion means, whereby a predetermined orientation is gyroscopically preserved until the vehicle reaches an orbital position where the propulsion means is activated and the vehicle's orbital parameters are correspondingly altered.

4. An orbit alteration system as recited in claim 3, wherein said propulsion means comprises, a pair of hemi-toroidal tanks symmetrically disposed within said vehicle for storing respectively an oxidizer and a fuel, a quantity of pressurized gas contained within each of said tanks for expelling said oxidizer and said fuel, a rocket motor mounted on the axis of symmetry of said vehicle, an injection device attached to said motor for controlling the rate of flow of said fuel and said oxidizer into said motor, and a feed line attached between each of said tanks and said injection device.

5. An orbit alteration system as recited in claim 3, wherein said control means comprises, an oscillator for generating timing signals, a memory connected to said oscillator, receiving means for loading said memory with operating instructions and the time at which said operations are to begin, a clock connected to said oscillator and said memory for comparing the timing information contained in the memory and the instantaneous time for initiating the sequence of operation of said magnetic means, spin-up means and said propulsion means, and a regulating circuit activated by said memory for selectively actuating said magnetic means, spin-up means and said propulsion means.

6. A method for altering the orbit of a satellite in flight, comprising the steps of, orienting the satellite with the magnetic field of the celestial body about which it is orbiting, rotating said satellite about its thrust axis to gyroscopically preserve a predetermined pitch attitude, and changing the velocity of said satellite along its thrust axis at a predetermined orbital position to alter its orbital path.

7. In an orbiting space vehicle of symmetrical construction moving in the magnetic field of a celestial body, an orbit alteration system for adjusting the orbital parameters of said vehicle, comprising, despin rods contained within said vehicle and positioned perpendicular to the axis of symmetry of said vehicle, a plurality of electromagnets positioned within said vehicle and creating a vehicle dipole axis parallel with said vehicle's axis of symmetry for attaining predictable vehicle orientation in orbit, propulsion means mounted within said vehicle and positioned to create a thrust axis along the symmetry axis of said vehicle, and control means for sequentially activating said magnetic means and said propulsion means, whereby said propulsion means is activated when said vehicle possesses a predetermined orientation and its orbital parameters are correspondingly altered, said propulsion means comprising, a pair of hemi-toroidal tanks symmetrically disposed within said vehicle for storing respectively an oxidizer and a fuel, a quantity of pressurized gas contained within each of said tanks for expelling said oxidizer and said fuel, a rocket motor mounted on the axis of symmetry of said vehicle, an injection device attached to said motor for controlling the rate of flow of said fuel and said oxidizer into said motor, and a fuel line attached between each of said tanks and said injection device.

8. An orbit alteration system as recited in claim 7, wherein said control means comprises, an oscillator for generating timing signals, a memory connected to said oscillator, receiving means for loading said memory with operating instructions and the time at which said operations are to begin, a clock connected to said oscillator and said memory for comparing the timing information contained in the memory and the instantaneous time for initiating the sequence of operation of said magnetic means and said propulsion means, and a regulating circuit activated by said memory for selectively actuating said magnetic means and said propulsion means.

9. A method of transferring a space vehicle from a first orbital path to a second orbital path during the orbiting of said vehicle about a celestial body that is surrounded by a magnetic field of known pattern, said method comprising the steps of, orienting said space vehicle within said magnetic field in a predetermined manner such that the attitude of said vehicle during its movement along said first orbital path varies in accordance with the variations in the magnetic field pattern along said first orbital path, determining a first vehicle location along said first orbital path at which said vehicle, while in a particular attitude, will move from said first orbital path to said second orbital path upon occurrence of a determinable change of the vehicle's velocity vector along its thrust axis, tracking said vehicle to detect its location along said first orbital path, determining from the known pattern of said magnetic field a second vehicle location along said first orbital path at which said vehicle will attain said particular attitude, controlling said vehicle to maintain its existing attitude when said vehicle is detected as having reached said second vehicle location so as to thereafter preserve said particular attitude, and subsequently changing said vehicle's velocity vector along its thrust axis when said vehicle is detected as having reached said first vehicle location so as to move said vehicle to said second orbital path.

References Cited by the Examiner
UNITED STATES PATENTS

| | | | |
|---|---|---|---|
| 2,972,225 | 2/61 | Cumming et al. | 60—35.6 |
| 3,060,425 | 10/62 | Cutler | 343—112 |
| 3,093,346 | 6/63 | Faget et al. | 102—50 X |
| 3,100,963 | 8/63 | Michel | 60—35.6 |
| 3,114,518 | 12/63 | Fischell | 244—155 |
| 3,118,637 | 1/64 | Fischell et al. | 244—155 |

FERGUS S. MIDDLETON, *Primary Examiner.*

SAMUEL FEINBERG, *Examiner.*